No. 657,149. Patented Sept. 4, 1900.
A. H. WOOTTEN.
COMBINED PLANTER AND FERTILIZER DISTRIBUTER.
(Application filed June 2, 1900.)

(No Model.)

Witnesses,
H. C. Austin.
Jos. H. Milans

Inventor,
A. H. Wootten,
By Milo B. Stevens & Co.
Attorneys.

THE NORRIS PETERS CO., PHOTO-LITHO., WASHINGTON, D. C.

UNITED STATES PATENT OFFICE.

AUGUSTUS H. WOOTTEN, OF LOUISVILLE, GEORGIA.

COMBINED PLANTER AND FERTILIZER-DISTRIBUTER.

SPECIFICATION forming part of Letters Patent No. 657,149, dated September 4, 1900.

Application filed June 2, 1900. Serial No. 18,871. (No model.)

*To all whom it may concern:*

Be it known that I, AUGUSTUS H. WOOTTEN, a citizen of the United States, residing at Louisville, in the county of Jefferson and State of Georgia, have invented certain new and useful Improvements in Planters for Cotton, Grain, and the Like, Combined with a Fertilizer-Distributer; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to a planter for cotton, grain, and the like, combined with a fertilizer-distributer.

A primary object is the provision of a machine wherein a suitable fertilizer may be distributed from one compartment while the grain or other material to be planted is being fed from another compartment. To accomplish this object, I preferably employ a hopper having two compartments, the one for the fertilizer and the other for the seed, and a driving or feed wheel adapted to revolve beneath openings formed in the bottom of the hopper and to receive grain through such openings and in its revolving movement carry the same and deposit it onto the ground beneath the machine.

The invention also relates to improved plungers for regulating the size of the pockets in the driving-wheel, designed for the reception of the grain and for forcing the same therefrom, as also any dirt which may be forced into said pockets as the wheel comes in contact with the ground.

Other improved details in the construction and arrangement of the several parts of the machine will be apparent.

In the accompanying drawings an embodiment of the invention is illustrated, and in hereinafter referring to such drawings like letters of reference will designate corresponding parts in the several figures.

Figure 1:
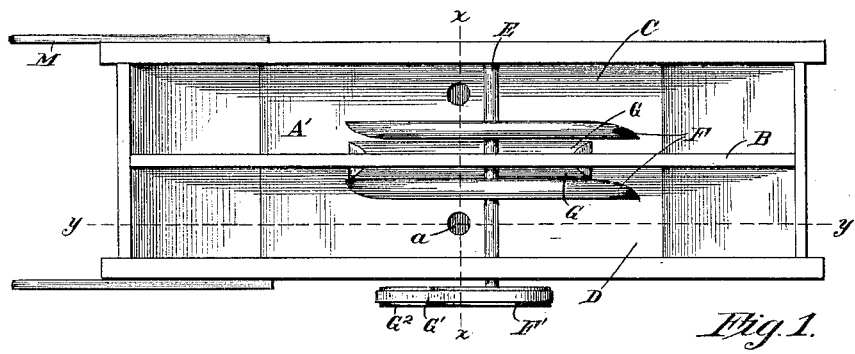
Figure 3:
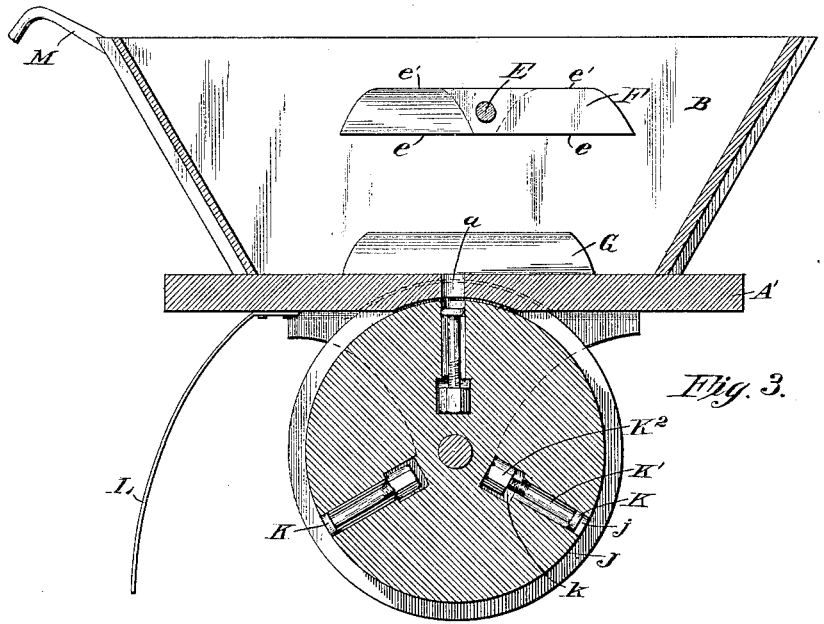
Figure 4:
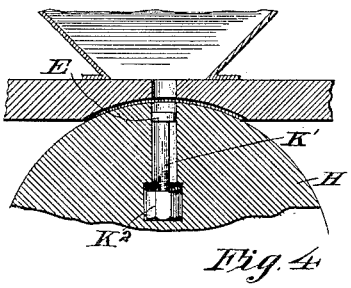
Figure 2:
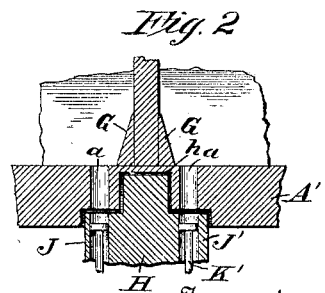

Figure 1 is a plan view of the machine. Fig. 2 is a detail section on the line $x\ x$ of Fig. 1. Fig. 3 is a transverse section on the line $y\ y$ of Fig. 1, and Fig. 4 is a detail vertical section of a modified form of the machine.

Referring more specifically to the drawings, A designates a hopper, which may be of any approved configuration, preferably provided with sloping ends to provide a proper feed for the material. This hopper is divided longitudinally by the partition B into the two receptacles C and D, designed, primarily, for the reception of fertilizing material and seed, respectively; but, as will be apparent, any material whatever may be carried and fed from the receptacle. The bottom A' of the hopper in the center of each receptacle is perforated at $a$ to permit of a proper feed of material therethrough. At a central position in the receptacles is mounted a rotary shaft E, upon which are secured agitator-blades F of peculiar shape. (Best seen in Figs. 1 and 3.) These blades have relatively sharp and blunt edges $e\ e'$, respectively, and when rotated through the medium of a pulley F' engage and scrape upon the inclines G, secured to the sides of the partition B, and cause the material to readily feed into the apertures in the bottom of the hopper. A belt or chain G' imparts a proper rotary movement to the pulley G through the medium of a corresponding pulley $G^2$, mounted upon the axle of the main driving-wheel H. Mounted so as to revolve directly beneath the apertures in the bottom of the hopper is the combined driving and feed wheel H. This wheel has a projecting central portion, which is adapted to contact with the ground and also to project upward into the recessed portions or guides $h$, formed in the bottom of the hopper. These guides or recessed portions prevent any lateral movement of the wheel. To the sides of this projecting portion of the wheel are reduced portions J J', and disposed at suitable distances apart around the periphery of these reduced portions are pockets $j$, adapted to receive seed through apertures in the bottom of the hopper. To regulate the size of these seed-receiving pockets and to also insure the proper deposit of such seed upon the ground, I arrange in said pockets plungers K, having suitable screw-threaded shank portions K'. A nut $K^2$ is adjustable upon the screw-threaded shank K' to regulate the movement of the piston in the seed-receiving pocket. The nuts are retained in the cut-out portions k formed in the sides of the wheel, and not only serve to adjust the size of the pockets, but also constitute weights for forcing the plungers outward, by gravity, when the wheel is turned, so as to eject the seed from the pockets onto the ground. It will thus be seen that as the drive-wheel is rotated the fertilizing material and the seed will be received in the pockets at the respective sides of the wheel and deposited at the same time onto the ground, so that a proper proportion of the two will always be maintained and uniformly fed.

To the rear of the machine are coverer-teeth L, adapted to travel immediately in rear of the pocketed portions of the wheel and cause the material fed thereby to be properly intermingled with the soil.

The machine may be operated in any desirable manner; but for simplicity in illustration I have provided the handles M.

In Fig. 4 I have shown a modified form of the machine in which the seed-receiving pockets are formed in the periphery of a drive-wheel rather than in reduced portions to the side thereof. In this form of machine there is simply the one series of pockets, provided with suitable plungers, as described in connection with the above first-mentioned machine.

Having thus described my invention, what I claim as new, and desire to secure by Letters Patent, is—

1. In a planter, the combination with suitable receptacles having discharge-openings in their bottoms, of means for conveying the material from said receptacles to the ground comprising a driving-wheel having a projected portion adapted to contact with the ground and reduced side portions provided with pockets adapted to receive the material from the receptacles, substantially as described.

2. In a planter, the combination with a suitable receptacle, means for conveying the material from the receptacle to the ground, and an agitator-blade in said receptacle having oppositely-disposed sharp and dull edges adapted to be rotated, and an inclined portion in said receptacle adapted to be engaged by said agitator, substantially as described.

3. In a planter, the combination with a suitable receptacle, a supporting and driving wheel located beneath said receptacle and provided with a series of pockets in its periphery, plungers located in said pockets, and means adapted to adjust and regulate the movement of said plungers in the pockets, to regulate the size of the pockets for the reception of the material from the receptacle, substantially as described.

4. In a planter, the combination with a suitable receptacle having guideways h formed in its bottom, of a driving and feed wheel located beneath the receptacle having a projected portion adapted to contact with the ground and prevented from lateral movement by the guideways in the bottom of the receptacle, and reduced portions in the side of the wheel provided with suitable pockets for the reception of material from the receptacle, substantially as described.

In testimony whereof I affix my signature in presence of two witnesses.

AUGUSTUS H. WOOTTEN.

Witnesses:
R. N. HARDEMAN,
J. A. GORDON.